Figure 1:
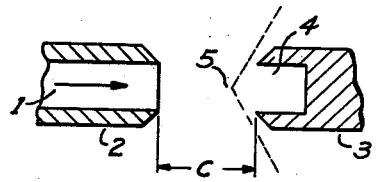

May 5, 1964 R. W. FETTER 3,131,671
ACOUSTIC GENERATOR
Filed April 22, 1960

INVENTOR.
RICHARD W. FETTER
BY
ATTORNEY

United States Patent Office 3,131,671
Patented May 5, 1964

3,131,671
ACOUSTIC GENERATOR
Richard W. Fetter, Overland Park, Kans., assignor, by mesne assignments, to the United States of America as represented by the Secretary of the Navy
Filed Apr. 22, 1960, Ser. No. 24,179
7 Claims. (Cl. 116—137)

The present invention relates generally to acoustic sound sources and, more particularly, to an acoustic air jet generator capable of developing intense supersonic signals.

In copending application, Serial No. 4,840, of Eugene D. Denman et al., filed January 26, 1960, and assigned to the same assignee as the present case, there is disclosed a method for determining the air velocity of a moving vehicle, such as, for example, a helicopter, which involves radiating a sound wave from the helicopter out beyond the turbulent region produced by its rotors and then echo ranging on the acoustic perturbation with a Doppler radar set. The Doppler shift in frequency brought about by the relative movement of the vehicle and the acoustic wave is analyzed to give an indication of the helicopter's air velocity.

In such a system it is important to have available a high level of acoustic energy because of dispersion, propagation losses and the attenuation encountered within the turbulent area. Maximum acoustic intensity is also desirable since it results in a greater change in the index of refraction of the perturbed atmospheric region. The extent of this change, it would be noted, governs the amount of electromagnetic energy back-scattered to the Doppler radar receiver.

It has been determined in connection with the operation of this type of velocity measuring system that the amount of back-scattered electromagnetic energy is maximized if the ratio of the wave lengths of the electromagnetic and acoustic energy is $$\frac{2}{A}$$

where A is any integer, but preferably 1. In practice, this means that the frequency of the acoustic signal should be as high as possible.

It is accordingly a primary object of the present invention to provide an acoustic generator which is capable of developing intense signals in the supersonic frequency band.

A still further object of the present invention is to increase the signal output level of a Hartmann-type air jet generator.

A still further object of the present invention is to improve the performance of the Hartmann air jet generator by employing gas dynamic principles of combustion therein.

A still further object of the present invention is to increase the output signal of a Hartmann whistle by increasing the energy across the nozzle jet primary oblique shock wave produced during the operation of this generator.

A still further object of the present invention is to modify a Hartmann-type air jet generator whereby an increased output signal is produced for a given air jet velocity.

A still further object of the present invention is to utilize the Hartmann-type air jet generator to measure the dynamic combustion characteristics of various fuels and oxidizers.

Figure 2:
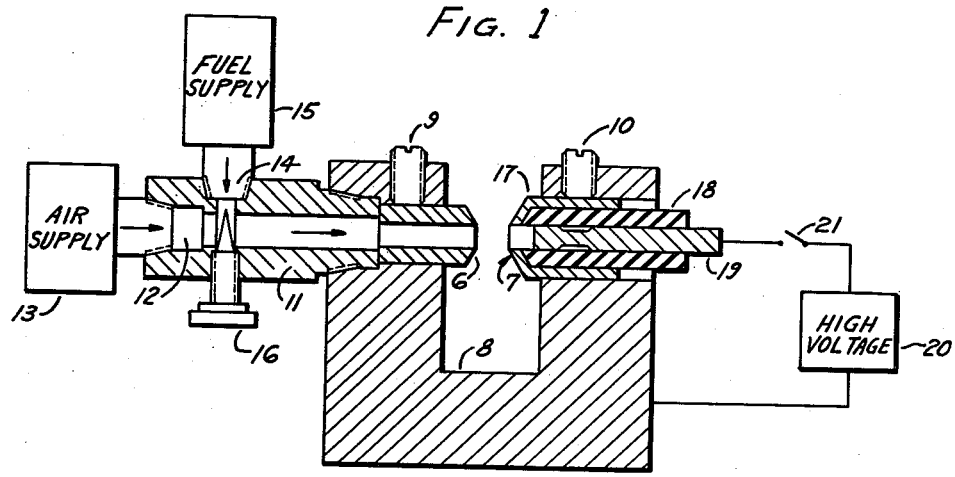
Figure 3:
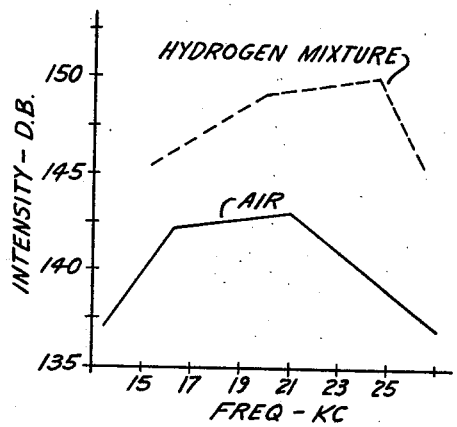

Other objects and many of the attendant advantages of this invention will be readily appreciated as the same becomes better understood by reference to the following detailed description when considered in connection with the accompanying drawings wherein:

FIG. 1 schematically illustrates a conventional Hartmann air jet whistle;
FIG. 2 illustrates one preferred embodiment of the invention wherein combustion takes place within the resonator of the Hartmann whistle; and
FIG. 3 is a plot of output versus frequency for two different modes of operation of the apparatus of FIG. 2.

Referring now to FIG. 1, which schematically illustrates the essential components of a conventional Hartmann air jet whistle capable of producing intense supersonic signals, excitation of this generator, as is well known, occurs when the air stream 1, emanating from tubular nozzle 2 and impinging upon coaxially spaced cylindrical resonator 3 having a cavity 4, exceeds the speed of sound and the nozzle-to-resonator distance C is properly adjusted so that the cavity entrance intercepts the air stream in an unstable region, defined by the nozzle jet primary oblique shock wave, causing the cavity to first fill with air to a pressure greater than the external pressure. Since the pressure decreases with distance out of the cavity, the arrangement is unstable and a slight fluctuation causes the cavity pressure to force air out of the cavity. The air will unload from the cavity until the pressure drops below the external pressure, at which point the cavity begins to refill and the cycle is repeated, establishing a system of intense acoustic oscillations at a frequency determined by the resonator dimensions, air pressure and density. The intensity response of this whistle varies with the pressure of the air reservoir feeding the nozzle, as well as the above parameter C.

To establish a higher acoustic output level for this generator, the present invention effectively increases the energy across the nozzle jet primary oblique shock wave, the apex of which is shown at point 5, the intersection of the extended beveled surfaces of the resonator and increases the amplitude of oscillation by adding the combustion energy of the fuel and oxidizer to the normally resonant air column within the resonator cavity. In a preferred embodiment, heat is added to the system on the downstream side of the shock wave by an arrangement which produces combustion within the resonant cavity. The fuel for this combustion, which may be gasoline, hydrogen or propane, for example, is mixed upstream from the nozzle and ignited within the cavity, the resultant confined combustion occurring in an oscillatory manner in synchronism with the acoustic oscillations and acting to increase the amplitude of the pressure variations. This phenomenon gives a greater sound pressure level for a given air jet velocity.

Referring now to FIG. 2, which illustrates a preferred embodiment of the present invention, a tubular nozzle 6 and a cylindrical resonator 7, standard components of a conventional Hartmann air jet generator, are maintained in spaced coaxial alignment by a U-shaped base member 8, the separation between these confronting components being adjustable by means of set screws 9 and 10. Threaded into base member 8 so as to be in an abutting relationship with one end of nozzle 6 is a fitting 11 which has a main passageway 12 leading to an air reservoir 13 and a secondary side passageway 14 leading to a fuel supply 15. A mixing valve 16 located at the juncture of these two passageways determines the proportions of air and fuel in the jetstream.

The cylindrical cavity resonator of the generator, generally represented by reference character 7, consists of an outer metallic sleeve 17, the leading edge of which is turned inwardly to form a central orifice, an insulated shell 18 and a metallic core 19, the latter having a portion near one end thereof of reduced thickness which acts to restrict the heat transfer along the rod and permit the terminal end portion to function as a hot-spot combustion sustainer. From an examination of the resonator assembly, it will be readily seen that the cavity portion thereof is defined by confronting edges of sleeve 17, adjacent portions of the inner wall of the shell 16 and the end of the metallic core 19 and that the dimensions of this cavity and, hence, the frequency of the air jet generator, can be varied by altering the axial position of the above core. A high voltage source 20 has one terminal connected to the base member 8 and the other connected via switch 21 to metallic core 19.

It will be readily appreciated that, when fuel is added to the jetstream from source 15 and switch 21 closed, ignition takes place within the cavity resonator, provided, of course, that the magnitude of the high voltage source is sufficient to produce a discharge spark between the end portion of the metallic core 19 and adjacent surfaces of metallic sleeve 17. Once ignition is started, the high voltage source can be disconnected since combustion will be sustained within the cavity because of the relatively high temperature level of the hot-spot combustion sustainer. As pointed out above, the combustion of fuel and air within the resonator cavity occurs in a discontinuous manner and adds its energy to the resonant oscillations caused by the air stream, that is, the periodic combustion pressure peaks and minimums occur at the same time as the peaks and minimums of the normal oscillations and, consequently, results in a higher output level for a given air pressure.

In FIG. 3 there is compared the output versus frequency performance of the apparatus of FIG. 2 with a conventional air stream and with a hydrogen-air mixture accompanied by combustion in the cavity resonator. In both cases, the nozzle diameter was 0.098 inch, the resonator diameter 0.094 inch, the nozzle pressure 40 lbs./sq. in. gauge and the nozzle-to-resonator spacing 0.110 in. Stable combustion occurred over a wide range of air-hydrogen ratios, for example, from 4 to 76 parts air to 1 part hydrogen and the signal form was clean and equal to or better than that when only air was used in the jetstream. It was found that the addition of hydrogen to the air jet without combustion increased the generator frequency approximately 3.5 kc. with only a slight increase in output and that rich hydrogen mixtures gave slightly lower output than lean mixtures.

It will be appreciated from the foregoing that, instead of using hydrogen as the fuel, propane, gasoline and other substances can be employed. However, in the relatively high, supersonic frequency ranges where the minimum nozzle air jet velocity, for example, is 1300 ft./sec., it is difficult to sustain combustion with gasoline and diesel fuels.

It will also be recognized that the dynamic combustion characteristics of various fuels and oxidizers can be investigated by means of the apparatus hereinbefore described. In other words, by utilizing different combinations of fuels and oxidizers in the jetstream will all other system parameters constant, the comparative energy of combustion of these mixtures can be ascertained by simply analyzing the output signal level, since this energy reacts with the resonant air column and appears in the system as an increase in the output signal intensity.

Obviously many modifications and variations of the present invention are possible in the light of the above teachings. It is therefore to be understood that within the scope of the appended claims the invention may be practiced otherwise than as specifically described.

What is claimed is:

1. In a method for increasing the sound level of a Hartmann whistle of the type wherein a supersonic air stream emanating from a nozzle is directed into the open end of a coaxially disposed cavity resonator, the step of producing combustion within said cavity resonator in the presence of the impinging air stream.

2. In a method for increasing the intensity of a Hartmann-type acoustic generator of the type wherein a supersonic air stream is directed into the open end of a cylindrical cavity resonator, the step of increasing the pressure across the primary oblique shock wave formed in front of said cavity resonator by maintaining a state of combustion within said cavity resonator.

3. The method of improving the output level of an acoustic generator of the Hartmann type wherein a supersonic air stream is directed into the open end of a cylindrical cavity resonator, the steps of adding a gaseous fuel to said air stream and igniting said gaseous fuel within said cavity resonator.

4. An improved Hartmann-type air jet generator comprising, in combination, a tubular nozzle, a cylindrical cavity resonator, said resonator being coaxially spaced from the exit side of said nozzle with the open end thereof facing said nozzle, means for supplying a mixture of air and gaseous fuel to the entrance side of said nozzle under pressure, whereby a supersonic jetstream is discharged from the exit side thereof, and means for producing a spark discharge within said cavity resonator thereby to ignite the gaseous fuel in said jetstream.

5. An improved Hartmann air jet generator comprising, in combination, a tubular nozzle, a cylindrical cavity resonator in coaxial alignment with said nozzle, said resonator comprising a metallic sleeve, the edge of said sleeve confronting said nozzle being turned inward to form a central aperture, an inner insulated sleeve having its outer diameter approximately equal to the inner diameter of said metallic sleeve, disposed within said metallic sleeve, a metallic core slidably disposed within said insulated sleeve, a source of high voltage connected across said metallic sleeve at said metallic core, and means for supplying to said nozzle a mixture of air and gaseous fuel under pressure, whereby a supersonic jetstream emerges from said nozzle and impinges upon said cavity resonator, the gaseous fuel contained within said jetstream igniting when said high voltage source produces a spark discharge within said cavity resonator.

6. An improved Hartmann air jet generator comprising, in combination, a tubular nozzle, means for supplying said nozzle with a mixture of air and gaseous fuel under pressure whereby a supersonic jet stream emerges from said nozzle, a tubular member closed at one end, the open end of said member being positioned in the path of said jet stream, and means for igniting the gaseous fuel contained in said jet stream within the tubular member, the resultant combustion increasing the pressure across the primary oblique shock wave formed in front of said tubular member and thereby increasing the output level of said air jet generator.

7. In a method for increasing the intensity of an acoustic signal produced by a Hartmann sound generator of the type wherein a supersonic air stream is directed into the open end of a cavity resonator, the step of synchronously adding combustion energy to the resonant air column produced by said supersonic air stream by burning a gaseous fuel within said cavity resonator.

References Cited in the file of this patent

UNITED STATES PATENTS

| | | |
|---|---|---|
| 1,500,243 | Hammond | July 8, 1924 |
| 2,238,668 | Wellenstein | Apr. 15, 1941 |
| 2,549,464 | Hartley | Apr. 17, 1951 |
| 2,745,372 | Chertoff | May 15, 1956 |

FOREIGN PATENTS

| | | |
|---|---|---|
| 917,823 | Germany | Sept. 13, 1954 |